Jan. 19, 1960 — K. E. NEWTON — 2,921,469
FLUID LEVEL INDICATING SYSTEM
Filed Feb. 1, 1954 — 3 Sheets-Sheet 1

INVENTOR:
Kenneth E. Newton
BY
*Thalter J. Jason*
ATTORNEY

Jan. 19, 1960     K. E. NEWTON     2,921,469
FLUID LEVEL INDICATING SYSTEM

Filed Feb. 1, 1954                                3 Sheets-Sheet 2

INVENTOR:
Kenneth E. Newton
BY
ATTORNEY

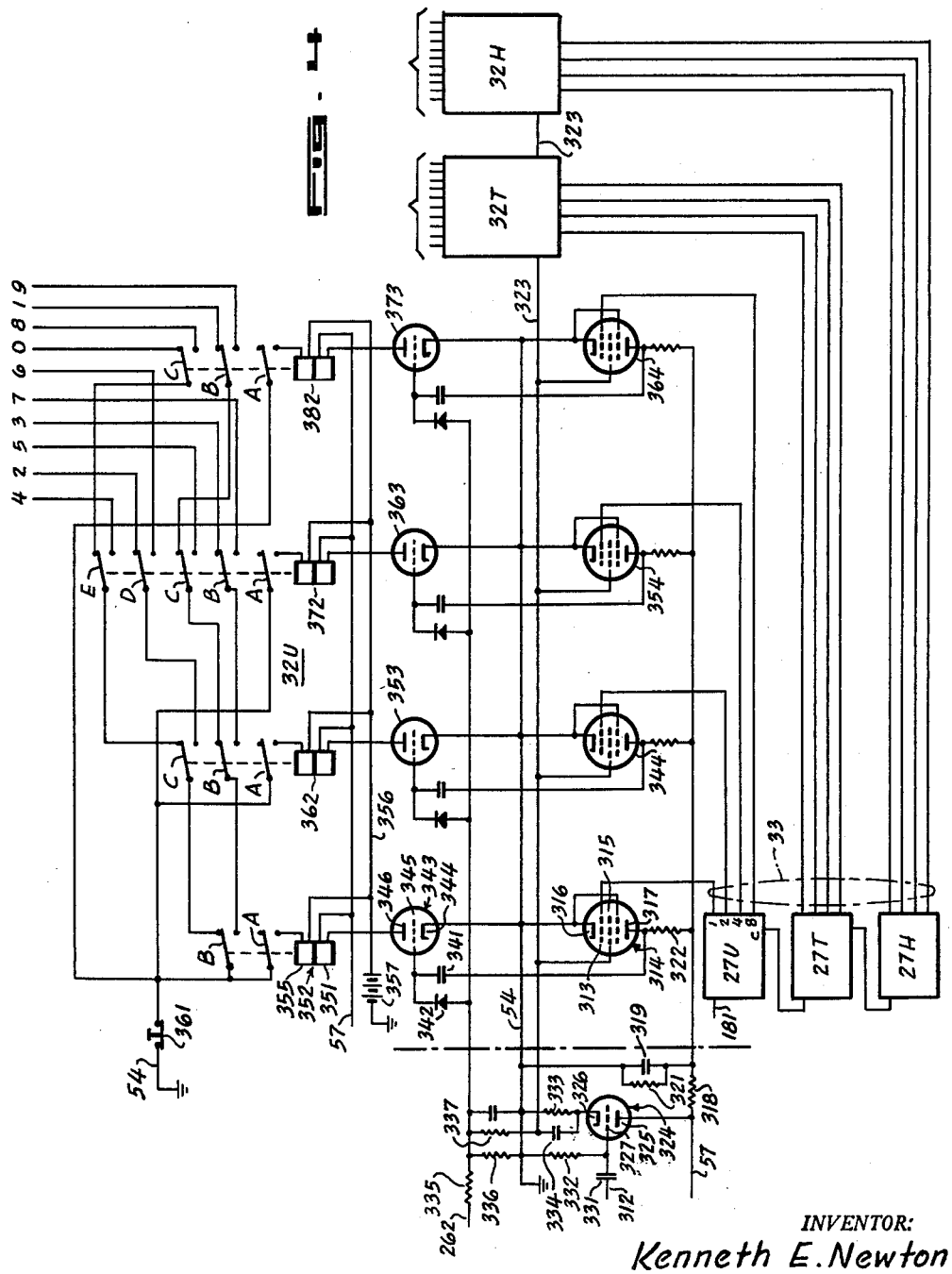

United States Patent Office 2,921,469
Patented Jan. 19, 1960

2,921,469

FLUID LEVEL INDICATING SYSTEM

Kenneth E. Newton, Park Forest, Ill., assignor, by mesne assignments, to General Dynamics Corporation, a corporation of Delaware Application February 1, 1954, Serial No. 407,456

11 Claims. (Cl. 73—290)

The present invention relates to data conversion systems and more particularly to a system which converts the height of fluid in a receptacle to a digital representation.

In fluid dynamic studies, wind tunnel testing, development of jet reaction propulsion systems, etc., the accurate determination of pressure at many points is required. Although many devices for measuring pressure are presently available, none is used more widely for accurate measurement than the manometer. This device is a U-shaped tube partially filled with a liquid of known density whereby the difference in pressure between the two ends of the tube is indicated by the displacement of liquid from one of the legs of the tube to the other. In order to facilitate reading of the indications of the manometer, one leg of the U-tube is in the form of a relatively large chamber with the other leg being in the form of a relatively narrow bore tube. Thus, a negligible change in level in the large reservoir is accompanied by a large change in level in the narrow bore tube, and readings are taken on the narrow bore tube by reference to indicia placed adjacent to the tube. Where a large number of simultaneous readings are required it was necessary heretofore either for an observer to read and record the indications of the manometer or to photograph the manometer, process the photographs, and read and record data from the photographs. Either method is time-consuming and inaccurate due to parallax and possible human error and, consequently, impedes the efficient operation of the test facilities. The necessity for 30 or 40 simultaneous pressure measurements is not unusual in such work and the only feasible technique heretofore for reading such a plurality of manometers has been the photographic method. In addition to the parallax and human errors involved, the limitations and inadequacies of this method are more apparent when a series of dependent tests are required. Development of the film and reduction of manometer data to usable form in terms of pressure are required to proceed intelligently with the next set of conditions.

It is therefore, an object of the present invention to provide a system for automatically measuring the height of fluid in a receptacle and manifest the result concurrently.

It is another object of this invention to provide an accurate means for indicating the height of fluid in a receptacle not requiring human observation.

Another object of this invention is to provide a system for accurately converting the height of a fluid in a container to a digital representation thereof.

Another object of the present invention is to provide apparatus for indicating and representing the height of fluid in a receptacle in a digital form capable of actuating automatic data processing or computing equipment.

It is a still further object of the present invention to provide a system to promote economy in time, labor and materials in fluid dynamic laboratory facilities.

Other objects and features of this invention will be readily apparent to those skilled in the art from the following specification and appended drawings illustrating a preferred embodiment in which:

Figure 4 is a schematic circuit diagram of one of the binary converter storage units shown in Figure 1.

Figure 5 is a timing diagram illustrating the operation of the component circuits of the present invention.

Figure 6 is a schematic view of one form of counting head and Figure 7 is a schematic view of a fluid level sensing unit according to the present invention.

Figure 1:
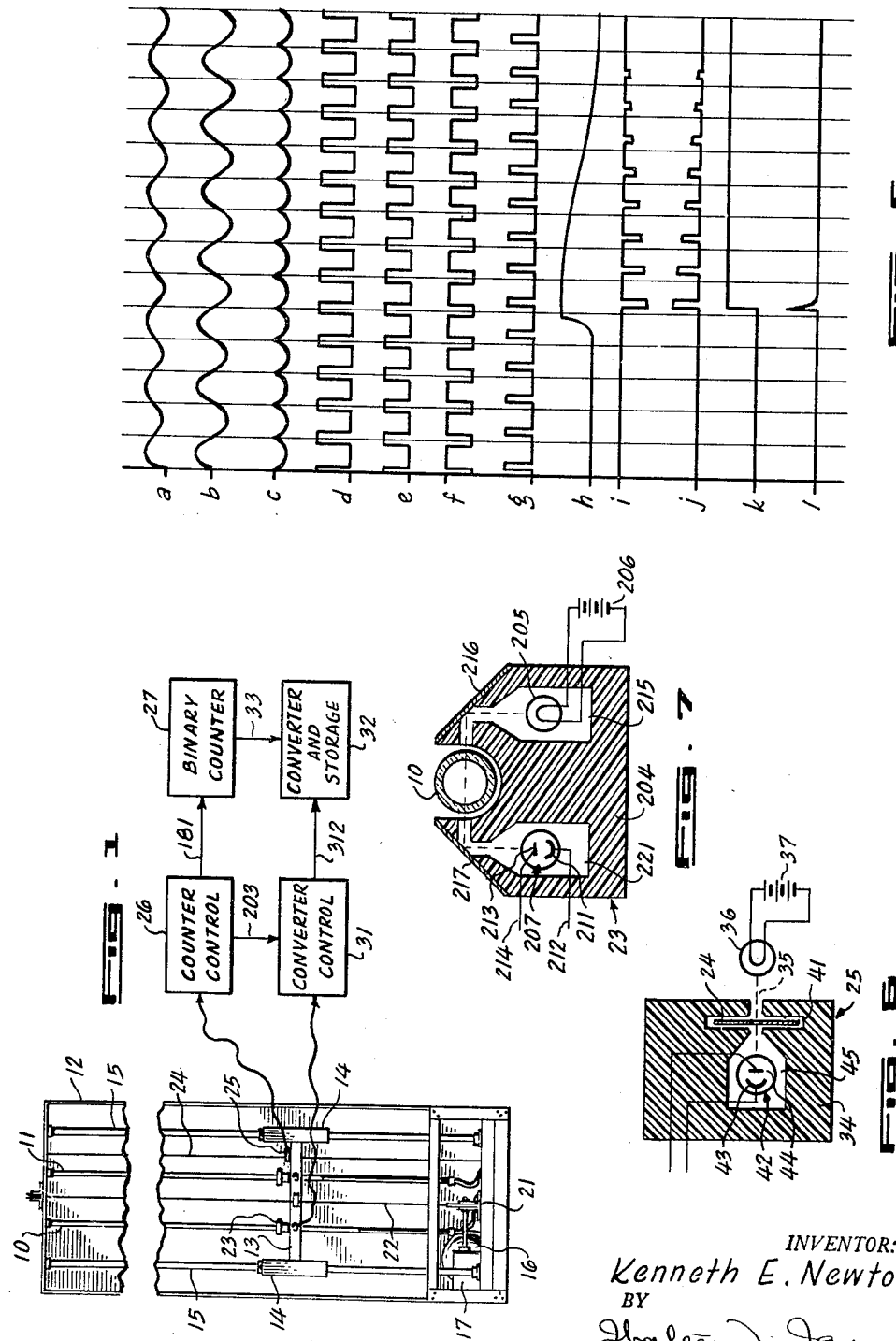
Figure 1 is a schematic diagram of a system for measuring the height of fluid in receptacles.

Referring now to Figure 1 of the drawings, which illustrates the principles of the present invention, a pair of transparent fluid receptacles 10 and 11 are shown mounted on a supporting member 12. The receptacles 10 and 11, in an illustrative embodiment of the present invention, form the narrow bore legs of a pair of manometers. Chambers (not shown), having a relatively large volume compared with the tubes 10 and 11, form reservoirs of fluid of known density and by interconnection with tubes 10 and 11 serve as the second of the two legs for each monometer. By suitable connection to the point at which pressure is to be monitored, the level of manometric fluid in the narrow bore tube will be directly proportional to the pressure at the monitored point. Thus, the level of fluid will vary from a standard level as the monitored pressure is greater or lesser than atmospheric pressure. Measurement of the height of the fluid with reference to a standard position thus represents the measurement of the applied pressure. Although the principle of the present invention is described in connection with the determination of pressure by the measurement of the height of manometric fluids in small bore tubes, it will become apparent and should be understood that the present invention is not limited thereto. The height of the fluid in tubes 10 and 11 may represent the level of fluid in any container.

A carriage 13 is retained by appropriate bearings 14 between a pair of guide members 15, which are preferably positioned substantially parallel with tubes 10 and 11. Carriage 13 is connected to a motor 16 by means of a mechanical linkage including a gear box 17, a pulley 21, and a cable 22. Motor 16 is connected to a suitable power source (not shown) and upon actuation imparts movement to carriage 13 through the mechanical linkage in a direction parallel to tubes 10 and 11. Sensing unit 23 may be suitably affixed to carriage 13 and adjacent to and cooperating with fluid receptacle 10.

Scaling means may include an opaque tape 24 suitably arranged in parallel relationship with receptacles 10 and 11 and a read head 25 affixed to carriage 13. Tape 24, in the embodiment illustrated, is perforated by equidistant circular holes disposed longitudinally along the tape. Read head 25 cooperates with tape 24 to provide a signal responsive to the opaque and perforated sections of the tape in a manner to be described hereinafter. As will appear obvious, other scaling means than that described may be provided, such as magnetic tape and electro-magnetic reading means, or a variable frequency oscillator frequency responsive to the velocity of carriage 13. Read head 25 provides a periodic signal to counter control 26 in a manner described hereinbelow. Counter-control circuits 26 include a frequency doubler and a pulse shaper, which serve to actuate a binary decade counter 27 of a known type and forming no part of the present invention. Thus, it is apparent that binary decade counter 27 will exhibit a digital representation of the position of carriage 13 at all times.

As carriage 13 is moved upwardly at substantially uniform velocity along guide members 15, fluid level sensing means, which includes sensing head 23, remains quiescent until the surface of the fluid in container 10 is reached. At this point, sensing head 23 detects the discontinuity and delivers a signal to converter control 31. The signal delivered by head 23 is shaped by converter control means 31 in a manner suitable to provide a pulse to binary-decimal converter and storage means 32. A gate is provided in storage circuit 32, which is responsive to the pulse delivered by converter control means 31, and allows the count standing in binary decade counter 27 at that instant to be transferred to storage means 32 by means of cable 33. The count transferred in this manner is then translated from binary form to a decimal representation suitable for use in a conventional calculator punched card or other digital calculating device.

As mentioned hereinabove in connection with Figure 1, tape read head 25 is mounted on carriage 13 in such a manner as to cooperate with tape 24. In the illustrative embodiment opaque tape 24, fixedly mounted on supporting member 12, has perforations therein equidistantly spaced longitudinally along its length. The distance between said holes is preferably in the order of the radius of the perforations.

An illustrative embodiment of tape reading head 25 is further exemplified by the drawing of Figure 6. An opaque supporting and enclosing body 34 is provided with an orifice 35 for admitting light from a suitable light source 36 actuated by an energy source 37. An elongated chamber 41 is provided in body 34 to allow head 25 to substantially laterally enclose tape 24 while head 25 travels longitudinally along tape 24 as carriage 13 travels along guide members 15. A light-responsive device 42, which may be a photo-voltaic cell containing a cathode 43 and an anode 44, is fixed in an aperture 45 in such a manner as to be responsive to light rays from source 36 which enter orifice 35 after passing through the perforations in tape 24. Photo-voltaic cell 42 generates a voltage as light rays are admitted by perforations in tape 24 and is quiesent as non-perforated sections of tape 24 cut off the incident light rays. Thus, as read head 25 is carried along tape 24 by carriage 13, a series of voltage impulses is generated with each impulse representing a unit of travel of carriage 13. The units of travel of the carriage 13 represented by these impulses may be of any size desired depending upon the spacing of the perforations in tape 24. It should be understood that the described carriage-position determining head 25 and associated perforated tape 24 are illustrative only. Other embodiments are comprehended, such as magnetic tape and electromagnetic sensing.

Figure 2:
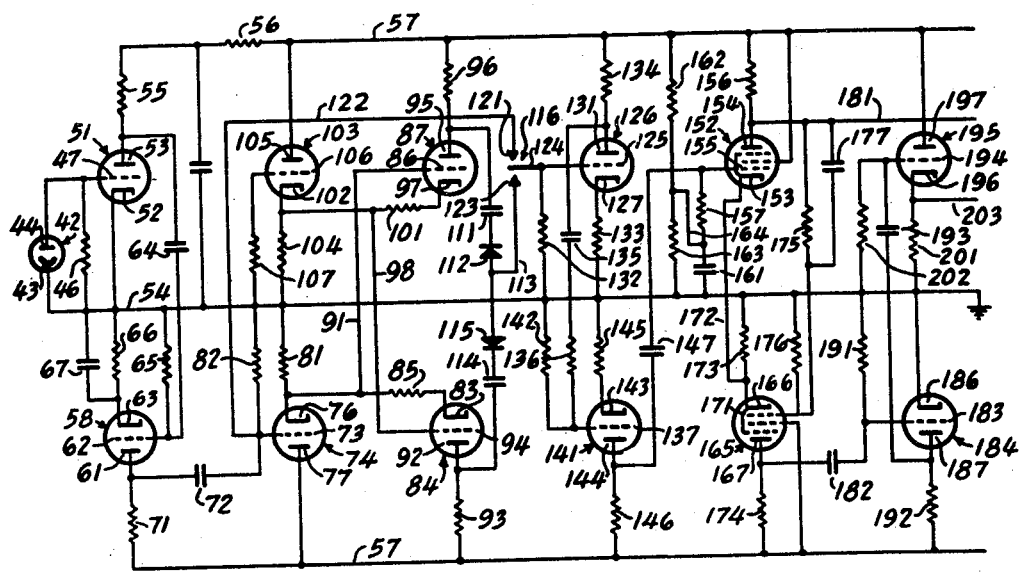
Figure 2 is a schematic circuit diagram of the counting control circuit shown in Figure 1.

Referring now to Figure 2, the signal generated by photocell 42, as illustrated by Figure 5(a) is applied across grid resistor 46 to control electrode 47 of amplifier tube 51. Electron discharge device 51 includes, in addition to control electrode 47, a cathode 52 and an anode 53. Cathode 52 of tube 51, cathode 43 of cell 42, and one terminal of grid resistor 46 are connected to ground bus 54. Anode 53 of electron tube 51 is connected to a high-voltage power source (not shown) through load resistor 55, dropping resistor 56, and high-voltage bus 57.

The signal generated by the photocell 42 as the carriage 13 is moved relative to the fluid receptacles 10, which appears with amplified magnitude at the anode 53 of tube 51, is further amplified by a circuit including an electron discharge device 58 having an anode 61, a control electrode 62, and cathode 63. Control electrode 62 is connected to anode 53 of discharge device 51 through blocking capacitor 64, and to ground through a resistor 65. Cathode 63 is connected to ground bus 54 by cathode bias resistor 66 and associated bypass capacitor 67.

Anode 61 is connected to the high voltage source (not shown) by means of load resistor 71 and high voltage bus 57.

The amplified output signal from electron discharge device 58 and illustrated in Figure 5(b) is applied through blocking capacitor 72 to control electrode 73 of electron discharge device 74, which also includes a cathode 76 and an anode 77. Electron discharge device 74 forms a portion of a frequency doubler circuit and is connected as a cathode follower with cathode resistor 81 connected between cathode 76 and ground bus 54. Anode 77 is connected to a high-voltage power source (not shown) through high voltage bus 57. Grid resistor 82 is connected between grid 73 and ground bus 54. Cathode 76 is interconnected both to cathode 83 of electron discharge device 84 through cathode resistor 85 and to control electrode 86 of electron discharge device 87 by means of conductor 91. Electron discharge device 84 includes, in addition to cathode 83, an anode 92 connected to a power source (not shown) through load resistor 93 and high-voltage bus 57 and a control electrode 94.

Electron discharge device 87 includes, in addition to control electrode 86, an anode 95 connected through load resistor 96 and high-voltage bus 57, to a power source, and a cathode 97 connected through cathode resistor 101 to cathode 102 of electron discharge device 103. Cathode 102 is connected to ground bus 54 through cathode resistor 104 and to control electrode 94 of tube 84 by conductor 98. Electron discharge device 103 includes the cathode 102, an anode 105 connected to high voltage bus 57, and a control electrode 106 connected to ground through resistor 107.

The signal developed by the electron tube 58 and applied to control grid 73 of cathode follower tube 74 appears at the cathode 76 and is simultaneously applied to both cathode 83 of electron tube 84 and to control electrode 86 of electron tube 87. As the signal applied to cathode 83 and control grid 86 becomes more positive, electron discharge device 87 serves to amplify the signal. This amplified signal appears inverted at the anode 95 and is carried through blocking capacitor 111 and diode 112 to output lead 113. At the instant control grid 86 becomes more positive, however, cathode 83 of tube 84 also becomes more positive and tube 84 becomes cut-off. As the signal developed across resistor 81 and applied to both control grid 86 of tube 87 and cathode 83 of tube 84 becomes less positive, discharge device 84 becomes conductive and passes the signal to output lead 113 through blocking capacitor 114 and diode 115. Thus, it then becomes apparent that the positive-going portion of the signal is inverted and passed to output lead 113 by electron tube 87, whereas, the less positive, or negative-going, portion of the input signal is passed without inversion to output lead 113 by discharge device 84. The output signal of this frequency doubler circuit appearing on output lead 113 is illustrated by Figure 5(c). Electron discharge device 103 serves to balance the input impedances to discharge devices 84 and 87 by making the circuit symmetrical and to compensate for changes in potential of high-voltage bus 57 by varying the voltage drop through cathode resistor 104, and, therefore, cathode 97 and grid 94. The unidirectional characteristics of diodes 112 and 115 serve to isolate the output and prevent degenerative interaction between anodes 95 and 92 by allowing only negative-going signals to appear at output lead 113.

A single-pole double-throw switch 116 is provided permitting the output of either the frequency doubler or amplifying electron tube 58 to be applied to a shaper-amplifier. Contact 121 is connected to the output of amplifier tube 58 by means of conductor 122. Contact 123 is connected to the output of the frequency doubler by means of conductor 113. Thus, switch blade 124 may be utilized to select either signal by positioning said switch either at contact 121 or contact 123. Switch blade 124 of switch 116 will hereinafter be assumed to be in the position connecting the output of the frequency-doubler through contact 123 and switch blade 124 to control electrode 125 of electron discharge device 126 of the shaper-amplifier circuit, which is essentially a two stage, resistance coupled, over driven amplifier. In addition to control electrode 125, electron discharge device 126 includes a cathode 127 and an anode 131. Grid resistor 132 is connected between control electrode 125 and ground bus 54. Cathode 127 is connected to ground through cathode bias resistor 133, while anode 131 is connected to a power source (not shown) by means of high-voltage bus 57 and load resistor 134. The output signal developed by discharge device 126 is coupled from anode 131 through blocking capacitor 135 and resistor 136 to control electrode 137 of electron discharge device 141. Control electrode 137 is also connected to ground bus 54 through grid resistor 142. Accompanying control electrode 137 in electron discharge device 141 are cathode 143 and anode 144. Cathode bias resistor 145 is connected between cathode 143 and ground bus 54. Furnishing anode voltage to anode 144 is a high voltage source (not shown) connected to high voltage bus 57 and through load resistor 146 to anode 144.

As mentioned hereinbefore, the input signal to the shaper-amplifier may be either the output of the frequency doubler illustrated in Figure 5(c) or the output developed directly from tube 58 illustrated in Figure 5(b) depending upon the position of switch 116. With switch blade 124 placed in conductive relationship with contact 123, an input signal as illustrated in Figure 5(c) is coupled to the tube 126. Electron tubes 126 and 141 are biased to operate as a two-stage overdriven amplifier, and when operated in this manner the negative portions of the input signal are below the cut-off point of the electron discharge device and the positive portions of the input signal drive the electron discharge devices to the saturation condition. In this manner, the input signal is converted to a series of rectangular pulses of the same frequency as the input signal, as illustrated by Figure 5(d). Therefore, with the output of the frequency doubler circuit connected in circuit, each pulse in the output of the shaper-amplifier represents a unit of travel of carriage 13 which is half the interval between perforations of tape 24. However, when switch blade 124 is in cooperation with contact 121, each pulse in the output of the shaper-amplifier represents a unit of travel of carriage 13 equal to the interval between the perforations of tape 24.

The output signal from the shaper-amplifier, illustrated by Figure 5(d), is coupled through capacitor 147 to the input of an amplitude discriminator which includes electron discharge device 152 having at least a cathode 153, an anode 154, and a control electrode 155. Anode 154 is connected to a power source (not shown) through high-voltage bus 57 and load resistor 156. Control electrode 155 is connected to grid resistor 157, and capacitively connected to ground bus 54 through capacitor 161. Proper control electrode voltage is supplied to control electrode 155 by means of a voltage divider comprising resistor 162 and resistor 163, connected between high voltage bus 57 and ground bus 54. Lead 164 is connected at the junction of resistors 162 and 163 at one end, to the junction of capacitor 161 and resistor 157 at the other, thus applying a high positive bias to control electrode 155 of electron discharge device 152. Also included in the amplitude discriminator is electron tube 165 having at least a cathode 166, an anode 167, and a control electrode 171. Cathode 166 of electron discharge device 165 is connected to cathode 153 of electron discharge device 152 by conductor 172. Both cathode 166 and cathode 153 are connected to ground bus 54 through common cathode resistor 173. Anode 167 of electron discharge device 165 is connected to high voltage bus 57 through load resistor 174. Control electrode 171 of electron discharge device 165 is connected to anode 154 of electron discharge device 152 through high impedance resistor 175 and to ground bus 54 through grid resistor 176. A capacitor 176 is connected in parallel with resistor 175.

In operation, the signal illustrated in Figure 5(d) appears in the output circuit of tube 141 of the shaper-amplifier and is applied to control grid 155 of electron tube 152. In this circuit electron discharge device 165 is normally conducting, while electron discharge device 152 is cut off by the biasing action of the voltage appearing across cathode resistor 173. The voltage on the control electrode 155 of electron discharge device 152 is determined by the voltage divider action of resistors 162 and 163 and the input signal from electron discharge device 141. Resistors 162 and 163 are so selected that the voltage from this divider in combination with noise voltage will not be sufficient to cause electron tube 152 to conduct; but when combined with the input signal voltage, electron discharge device 152 will become conductive during the positive portions of the input signal illustrated in Figure 5(d). When the positive pulses cause tube 152 to conduct, tube 165 will then be driven to cut off. When the positive pulse is removed, electron discharge devices 152 and 165 revert to their original normal state. Thus, it may be seen that the amplitude discriminator is essentially a "one-shot" multivibrator circuit biased to "fire" only above a predetermined amplitude thereby eliminating transient noise which may be present in the input signal. The output signal, as illustrated by Figure 5(f), and developed at anode 154 of electron discharge device 152 is a series of negative-going pulses of the same period as the input signal. This chain of pulses is applied to a suitable binary-decade counter, as illustrated in Figure 1, over output conductor 181.

The output signal at anode 167 of electron discharge device 165 is similar in shape to the input signal applied to control grid 171, however, the inherent inversion characteristic of the circuit produces a series of positive pulses as illustrated in Figure 5(e). This output signal is applied through capacitor 182 to control electrode 183 of a circuit including electron discharge device 184, having, in addition to control electrode 183, a cathode 186 and an anode 187. A grid resistor 191 is connected between control electrode 183 and ground bus 54 with the cathode 186 being held at ground potential by connection to bus 54. Anode 187 is connected to a high potential power source (not shown) through high-voltage bus 57 and load resistor 192. Capacitor 182 and resistor 191 form a conventional resistor-capacitor differentiating circuit, hence, the square-wave output from electron tube 165, illustrated by Figure 5(e), is differentiated to form a series of sharp positive and negative pulses. Electron tube 184 is operated at a suitable part of its characteristic so that it amplifies and reverses the phase of the negative-going pulses supplied by the differentiator so that a series of positive pulses are obtained coinciding with the trailing edge of the pulses illustrated by Figure 5(e). The positive pulses so formed and illustrated by Figure 5(g) are taken from anode 187 and applied through blocking capacitor 193 to control electrode 194 of electron discharge device 195, which is connected in a cathode follower circuit. Electron discharge device 195 comprises, in addition to control electrode 194, a cathode 196 and an anode 197. Cathode 196 is connected to ground bus 54 through cathode load resistor 201. Control electrode 194 is also connected to ground bus 54 but through grid resistor 202. Anode 197 is connected directly to high voltage bus 57. The cathode follower serves to provide a low-impedance source for the pulse signal illustrated by Figure 5(g), and produced on output lead 203 for utilization in the converter control unit 31 to be described hereinafter.

As described hereinbefore, as carriage 13 traverses upwardly carrying the read head 25 along tape 24, two negative pulses are produced on output lead 181 of the counter control unit 26 for each unit of travel of the carriage 13. These pulses are applied to a binary counter 27, which may be similar to that disclosed in U.S. Patent 2,538,122 entitled "Counter" and issued to John T. Potter. As shown in Figure 4, a units decade 27U, a tens decade 27T, and a hundreds decade 27H are provided, however, it will be obvious to one skilled in the art that any suitable number of digital counting units may be employed. Each decade has four numerical leads and a carry lead. The voltage on each lead, such as 1, 2, 4, 8 or C associated with decade 27U, may be in either of two states. If the associated trigger unit in the decade counter is in the "off" condition, a negative voltage will appear on the particular output lead, whereas, if the trigger unit is in the "on" condition a positive voltage will appear on the output lead. As the units decade 27U recycles to zero at the count of ten, a signal is applied to the carry terminal C and registers a count in the tens decade 27T. Similarly, at the count of 100 the decade 27T, as well as 27U, recycles and a carry signal is applied to the hundreds decade 27H. Hence, with the lead 181 carrying the pulses produced at the output of the counter control unit 26 and connected, as shown in Figure 4, to the input terminal of units decade 27U, the total displacement of carriage 13 will be continually represented in digital form by the voltage conditions appearing on the output leads, 1, 2, 4, 8 and C associated with each decade unit and represented collectively by the reference numeral 33. Output leads associated with each decade unit are connected to appropriate circuits comprising the storage means 32, which will be described in detail hereinafter, hence the count existing in the binary counter 27, which represents the total displacement of the carriage 13, is continuously transferred to the storage unit 32.

As stated hereinbefore in connection with Figure 1, fluid level sensing means including sensing head 23 is suitably affixed to carriage 13 in a manner to cooperate with fluid receptacle 10, and to allow relative movement therebetween. Referring now to Figure 7, sensing head 23 may comprise an appropriate opaque supporting body 204 enclosing a light source 205 actuated by a source of electricity 206 and a photo-electric cell 207 having a photo-responsive cathode 211 and its associated conductor 212 and an anode 213 with its associated conductor 214. Supporting body 204 also includes a light link comprising the illuminating source 205 in chamber 215, light-reflecting means such as a suitable mirror surface 216 arranged to reflect the light beam supplied by illuminating source 205 through the transparent fluid container 10, a further reflecting surface 217 for reflecting the light beam to impinge upon photo-sensitive cathode 211 of photo-electric cell 207, which is suitably mounted in chamber 221. In operation as carriage 13 moves upwardly along guide member 15, sensing head 23 moves upwardly along fluid container 10 and the light beam generated by light source 205 is blocked from the cell 207 by the fluid in container 10. When the sensing head 23 reaches the surface of the fluid within the receptacle, the opaque fluid no longer intercepts the light beam. The light beam generated by the source 205 is permitted to pass through container 10 and impinge upon photo-responsive cathode 211 whereupon the cathode will emit a stream of electrons, thereby detecting the fluid level in container 10.

Other embodiments of sensing head 23 are contemplated by this invention. Capacitor plates may be provided substantially enclosing the fluid container, and the change in capacity at the fluid level may be sensed by known means and applied to converter control unit 31. Magnetic sensing cooperating with a magnetic fluid is similarly contemplated as being within the scope of this invention.

Where the determination of the fluid level in a plurality of containers is desired, sensing means as hereinbefore described may be associated with each container. As shown in Figure 1, additional receptacles, such as receptacle 11, may be mounted in the same manner as receptacle 10 and the associated sensing head may be mounted on carriage 13. However, it is also contemplated that additional fluid receptacles such as 11 may be remotely located from the container 10, with the fluid height being determined in the same manner as for any single container.

Figure 3:
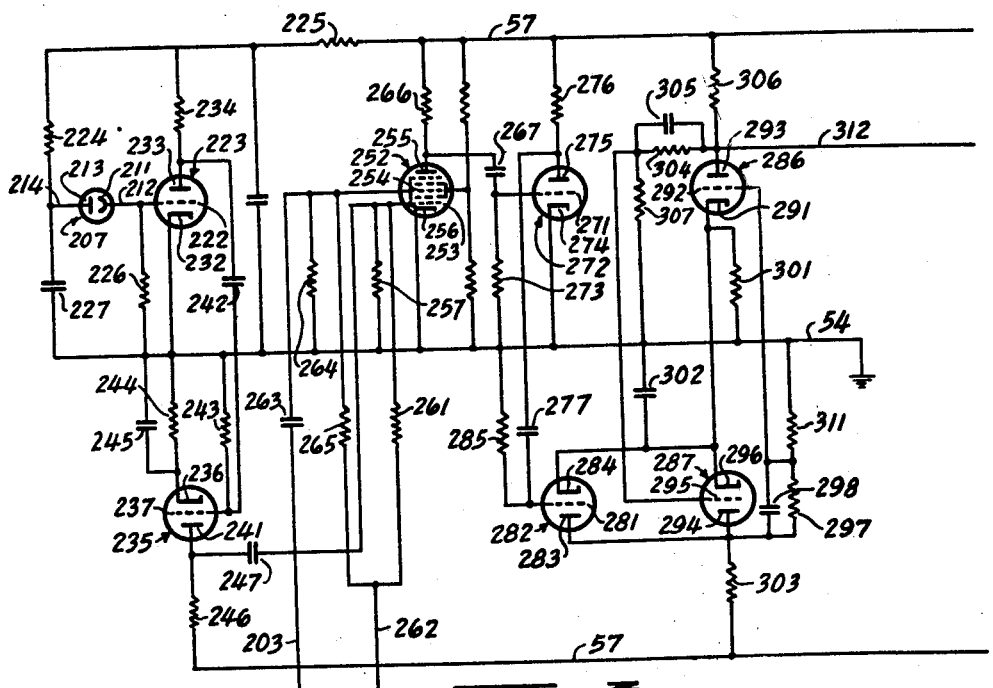
Figure 3 is a schematic circuit diagram of one of the converter control circuits shown in Figure 1.

Referring now to Figure 3, which schematically illustrates the converter control unit 31, photo-cell 207 mounted in sensing head 23 is shown with the cathode 211 connected by conductor 212 to control electrode 222 of electron discharge device 223. Anode 213 of photo-cell 207 is connected to a power source (not shown) through anode lead 214, current-limiting resistor 224, resistor 225 and high voltage bus 57. Resistor 226, serving as a grid return resistor for electron tube 223 and completing the D.C. circuit for photo-cell 207, is connected between lead 212 and ground bus 54. A capacitor 227 is provided between lead 214 and ground bus 54. Electron tube 223, a part of a two-stage, resistance-coupled amplifier includes, in addition to control electrode 222, a cathode 232 and an anode 233. Anode 233 is supplied with suitable operating potential by a power source (not shown) through high voltage bus 57, dropping resistor 225, and load resistor 234. Cathode 232 is directly connected to ground bus 54. Another electron discharge device 235, which is included in this two-stage amplifier includes a cathode 236, a control electrode 237, and an anode 241. Control electrode 237 is connected to anode 233 of electron tube 223 through blocking capacitor 242, and to ground bus 54 through grid resistor 243. Cathode 236 is connected to ground bus 54 through cathode bias resistor 244 and associated parallel bypass capacitor 245. Anode 241 is connected to high-voltage bus 57 through load resistor 246. In operation, as sensing head 23 is carried upward by carriage 13, the light beam from source 205 is blocked by the fluid in container 10. As described hereinbefore, above the surface of the fluid the light beam will impinge upon photo-emissive cathode 211, thereby discharging capacitor 227 and permitting current to flow through resistor 226. The voltage change thereby developed across resistor 226 is applied to electron discharge device 223, amplified, and applied to electron tube 235 of the hereinabove discussed amplifier whereupon it is further amplified. The output of discharge device 235 is illustrated by Figure 5(h), the voltage rise occurring when sensing head 23 arrives at the fluid surface in container 10.

The output of discharge device 235 appears at the anode 241 and is applied through blocking capacitor 247 to a gate circuit including an electron tube 252 having at least a first control electrode 253 and a second control electrode 254, an anode 255, and a cathode 356. First control electrode 253 is connected to anode 241 of electron discharge device 235 through blocking capacitor 247, to ground bus 54 through resistor 257, and to a negative high voltage source (not shown) through resistor 261 and conductor 262. Second control electrode 254 is connected to the output of cathode follower electron discharge device 195 in the counter control unit 26, illustrated in Figure 2, through blocking capacitor 263 and conductor 203. Control grid 254 is also connected to ground bus 54 through resistor 264 and to the aforementioned negative high voltage source through resistor 265 and conductor 262. Cathode 256 is connected to ground bus 54, and anode 255 is connected to high voltage bus 57 through anode resistor 266.

The amplified signal from fluid level-sensing photocell 207, of the form illustrated by Figure 5(h), is applied to control electrode 253 of electron discharge device 252. The output signal, illustrated in Figure 5(g), from cathode follower discharge device 195 in Figure 2, is applied over lead 203 to second control electrode 254 of electron discharge device 252. Here, the two signals are combined to produce a series of negative output voltage pulses, which are subsequent to the time at which sensing head 23 encounters the fluid surface of its associated container 10. Each control electrode of discharge device 252 is biased so heavily by the negative voltage supplied by conductor 262 that discharge device 252 remains in its cut-off condition unless both control electrodes 253 and 254 are driven positive simultaneously, thus functioning as a coincidence gate. The coincident output signal developed by this gating circuit and illustrated by Figure 5(i) is applied through blocking capacitor 267 to control electrode 271 of electron discharge device 272, which serves as an amplifier and phase inverter. Electron discharge device 272 includes, in addition to control electrode 271, which is connected to ground bus 54 through resistor 273, a cathode 274 connected to ground bus 54, and an anode 275 connected to high voltage bus 57 through load resistor 276. The input signal to discharge device 272, illustrated by Figure 5(i), is amplified and inverted with the resulting output signal from anode 275, shown by Figure 5(j), consisting of a series of positive pulses initiated by sensing head 23 passing the fluid surface in container 10 being applied through blocking capacitor 277 to control electrode 281 of buffer tube 282. Electron tube 282 contains an anode 283 and a cathode 284 in addition to control electrode 281. Control electrode 281 is also connected to ground bus 54 through input resistor 285.

Electron discharge devices 286 and 287 are connected in a flip-flop circuit with electron discharge device 286 having an anode 293, a control electrode 292 and a cathode 291; and electron discharge device 287 likewise having an anode 294, a control electrode 295 and a cathode 296. Anode 294 of tube 287 is connected to anode 283 of tube 282 and through resistor 297 and associated bypass capacitor 298 to control electrode 292 of tube 286. Anode 294 is also connected to high-voltage bus 57 through load resistor 303. Cathode 296 of tube 287 is connected to cathode 284 of tube 282, to cathode 291 of discharge device 286, and to ground bus 54 through common bias resistor 301 and bypass capacitor 302. Control electrode 295 of tube 287 is connected to anode 293 of discharge device 286 through resistor 304 and associated bypass capacitor 305. Anode 293 of discharge device 286 is connected to a power source (not shown) through high voltage bus 57 and load resistor 306. Resistor 307 serves as a grid resistor for electron discharge device 287, being connected between control electrode 295 and ground bus 54. Resistor 311 similarly serves as a grid resistor for electron discharge device 286, connecting control electrode 292 and ground bus 54. Under quiescent conditions the "flip-flop" circuit is so biased that electron tube 286 is conducting and electron tube 287 is cut-off. Switching buffer tube 282 is similarly normally in a cut-off condition. A series of positive pulses, illustrated by Figure 5(j), is taken from anode 275 of discharge device 272 and applied through blocking capacitor 277 to control electrode 281 of tube 282. The initial pulse so applied to control electrode 281 causes electron tube 282 to become conductive and a voltage drop is developed across anode resistor 303 and cathode resistor 301. The decreased voltage at the anode end of resistor 303 causes a drop in the voltage at control electrode 292 of discharge device 286, giving rise to a decrease in space current through discharge device 286. The decrease in space current increases the anode potential and thereby increases the potential on control electrode 295 and causes space current to flow in discharge device 287. The current through resistor 303 causes a further drop in the potential on control electrode 292 of discharge device 286, and thus further decreases space current. This action is cumulative and almost instantaneously discharged device 286 cuts off and discharge device 287 becomes conductive. Further pulses applied to discharge device 282 have no effect since they merely serve to lower the potential of control electrode 292 of discharge device 286, which is already cut-off. In this manner the step function illustrated by Figure 5(k) is generated at anode 293 of discharge device 286 and applied to the binary converter storage unit 32 of Figure 4 by means of output lead 312.

As described hereinbefore, as carriage 13, upon which the read head 25 is mounted, moves relative to the fluid container 10, the displacement of the carriage 13 is recorded in the units, tens, and hundreds decades of the binary counter 27. The binary representation of the relative displacement of the carriage 13 with respect to the container 10 is transferred over the cable 33 to converter and storage unit 32. Sensing unit 23 is also mounted on the carriage 13 and moved therewith, and when the sensing unit 23 reaches the fluid level in the container 10 during the scanning operation of the carriage, a pulse as illustrated in Figure 5(k) is produced by the converter control unit 31. This pulse is indicative of the position of the fluid surface in the container and is applied over lead 312 to the converter and storage unit 32.

Figure 4 schematically illustrates the converter and storage unit 32 and its interconnection with binary counter 27 and converter control unit 31. Converter and storage unit 32 comprises decade storage units 32U, 32T and 32H which are associated, respectively, with decade counter units 27U, 27T, and 27H. Each storage unit includes a plurality of gating circuits having two input terminals and a single output terminal, upon which a pulse is produced when positive pulses simultaneously appear on both input terminals. As stated hereinbefore, four output leads designated 1, 2, 4 and 8 are associated with each decade counter unit over which positive or negative potentials are applied depending upon the count registered in the unit. Leads 1, 2, 4, and 8 of each binary decade unit are individually connected to an assigned gating circuit of the associated storage unit and provide potentials on one of the two input terminals. The pulse representing the position of the fluid in container 10 and developed by the converter control circuit 31 described hereinbefore provides a potential to the other input terminal of all gating circuits of each storage unit simultaneously. Upon the establishment of a coincident condition on the input terminals, a pulse is applied on the output terminal to trigger a circuit associated with each gating circuit which in turn actuates a multiple contact relay. In cooperation, the four relay circuits associated with each converter and storage decade unit, such as 32U, establish conditions representing all digits required to set up the proper decimal equivalent of the count registered in the particular binary counter unit. The output provided by the converter and storage unit 32 is a decimal indication of the height of fluid in the container and is in the proper form for useful application with automatic data processing equipment.

Storage units 32U, 32T and 32H are preferably physically and functionally similar and, hence, for purposes of clarification storage unit 32U is shown in detail and will be hereinafter described in detail, whereas, units 32T and 32H are illustrated in block diagram form and will be described generally.

Considering now in detail storage unit 32U, the output lead 1 of the counter unit 27U is connected to a first control electrode 313 of electron discharge device 314, which includes in addition to control electrode 313, at least one other control electrode 315, a cathode 316, and an anode 317. Cathode 316 is connected to ground bus 54, while anode 317 is connected to a high voltage source (not shown) through high-voltage bus 57, a voltage divider composed of resistor 318 and resistor 321, and load resistor 322. As bypass capacitor 319 is provided across resistor 321 second control electrode 315 is connected to a converter control pulse bus 323 and to a negative voltage source (not shown) through negative high voltage lead 262, the junction of a voltage divider composed of resistor 335 and resistor 336, and bias resistor 337. The converter control pulse appearing on converter control pulse bus 323 is obtained from a differentiating circuit including an electron discharge device 324 having an anode 325, a cathode 326, and a control electrode 327. Anode 325 is connected to a power source (not shown) through high-voltage bus 57. Control electrode 327 is connected to input lead 312 through differentiating capacitor 331, and to ground bus 54 through differentiating resistor 332. Cathode 326 of electronic discharge device 324 is connected to ground bus 54 through cathode resistor 333 and to converter control pulse bus 323 through output capacitor 334. The rectangular step-function pulse illustrated by Figure 5(k) is applied to the differentiating circuit composed of capacitor 331 and resistor 332. In a manner well known to those skilled in the art, a sharp pulse, illustrated by Figure 5(l) is thereby generated and applied to control electrode 327 of triode 324. Connected as a cathode follower, discharge device 324 serves to provide a low-impedance source for the pulse signal generated by differentiating circuit and applied to converter control pulse bus 323.

Each decade of the converter and storage unit, as exemplified by 32U, includes four electron discharge devices represented by and substantially similar to electron discharge device 314. As shown by the drawings, electron-discharge device 314 is associated with output lead 1 of units decade 27U of counter 27, while electron discharge device 344 is joined to output lead 2, electron discharge device 354 to output lead 4, and electron discharge device 364 is linked to output lead 8 of units binary decade 27U. As stated hereinbefore, each pulse developed by the counter control circuits 26 and appearing on conductor 181 represents a unit of travel of carriage 13 and is counted in binary decade counter 27. The count appearing in the counter at any instant is represented by a positive voltage on particular output leads. The output leads from each decade of counter 27 are applied to a control electrode of corresponding pentode gate such as control electrode 313 of pentode 314 in binary converter unit 32. As the fluid level in a container such as 10 is sensed, a pulse illustrated by Figure 5(l) is applied on bus 323 simultaneously to a second control electrode of all the pentode gates, such as control electrode 315 of electron discharge device 314. Since said pentode gates are biased to conduct space current only when positive signals are present on both control electrodes, it is readily understood that the pulse on bus 323 will cause only those gates to conduct which also have a positive count voltage applied at that moment by its associated binary counter lead.

As one of said pentodes, as exemplified by discharge device 314, conducts, capacitor 341 will discharge through the low-resistance path formed by conducting pentode 314 and diode rectifier 342.

Capacitor 341 and diode 342 are associated with a relay-actuating electron discharge device 343. Included in said discharge device are a cathode 344, a control electrode 345 and an anode 346. Cathode 344 is connected to ground bus 54, while anode 346 is connected to a high-voltage source (not shown) through actuating winding 351 of relay 352 and high voltage bus 57. Similar electron discharge devices 353, 363 and 373 and similar relays 362, 372 and 382 are provided. Discharge device 353 and relay 362 cooperate with gate 344, tube 363 and relay 72 cooperate with gate 54, while tube 373 and relay 382 cooperate with gate 364. Each relay may have a duality of windings, including an actuating winding such as 351, and a locking winding such as 355. Each relay additionally has a plurality of contacts including a locking contact A and varying number of binary to decimal translating contacts identified by the letters B to E, illustrated in Figure 4 in the normal, unoperated positions.

As one of said gates, 314 for example, is caused to conduct, as explained hereinabove, coupling capacitor 341 discharges through diode 342 and discharge device 314. Gate discharge device 314 ceases to conduct as the pulse on bus 323, illustrated by Figure 5(l), decays and capacitor 341 commences to charge through resistor 322 and diode 342. Since diode 342 presents a high resistance to the current charging capacitor 341, the R-C time constant is high and a long positive pulse appears on control electrode 345 of electron discharge device 343. This positive pulse is of an amplitude sufficient to overcome the negative bias supplied to the control electrode 345 by negative voltage bus 262 and the voltage divider formed by resistors 335 and 336, thus causing electron discharge device 343 to conduct for the period determined by said capacitor charging pulse. Anode current from discharge device 343 flows through actuating winding 351 of relay 352 for sufficient length of time to cause relay 352 to operate. Contact A in its operated position closes a holding circuit from current source 357, bus 356, locking winding 355, operated contact A, closed reset switch 361 and ground bus 54, thus locking the relay in its operated position. A combination of operated and unoperated translating contacts complete a circuit from decimal lines 0-9 to ground. The decimal indication so provided is stored on said relays for any desired period of time, until reset switch 361 is actuated interrupting said locking circuit and allowing actuated relays to fall back to their unactuated condition.

Assuming a count of seven is standing in units decade 27U of binary counter 27 when the fluid surface is sensed, output lines 1, 2 and 4 will impress positive voltages upon the control electrodes of discharge devices 314, 344 and 354. The pulse impressed upon bus 323 as the fluid level is sensed, causes discharges devices 314, 344 and 354 to conduct, and, as has been explained hereinabove, causes relays 352, 362 and 372 to operate and lock. This combination of operated relays completes a circuit from the corresponding output line 7, through operated contact 372 "B," operated contact 362 "B," operated contact 352 "B," closed reset switch 361 to ground through ground bus 54.

If nine is the digit standing in units counter decade 27U, relays 382 and 352 are actuated and locked. A circuit is established from line 9 through operated contact 382 "B," operated contact 372 "C" unoperated contact 362 "B," unoperated contact 352 "B," switch 361, and ground bus 54 to ground. It thus may readily be seen that the four binary relays 352, 362, 372 and 382 set up circuits to ground for the corresponding one of ten possible decimal output lines through a combination of relay contacts.

Identical tens decade 32T and hundreds decade 32H of the binary-decimal converter are similarly actuated by the fluid level representing pulse on bus 323 and binary counter decades 27T and 27H respectively, exhibiting similar output indications. While only three decades are illustrated it will appear obvious to one skilled in the art that any number of decades may be utilized as described to provide the required accuracy of indication of fluid level within the limits of the sensing elements.

The decimal output indication provided by this invention may be applied to a conventional punched-card calculator of a known type, which is no part of this invention, or automatically punched on punch-cards for future calculation, as will appear obvious to one skilled in the art. Thus, it will be seen that there has been provided a means for automatically sensing the level of fluid in a container and storing and manifesting the fluid level in a decimal digital form capable of actuating automatic data processing systems thereby providing calculated, reduced manometric data for fluid-dynamic laboratory studies substantially simultaneously with the sensing of fluid level in manometric containers.

A carriage 13 is herein provided translatable longitudinally along a number of fluid containers, such as 10 and 11. As carriage 13 is moved upwardly by motor 16, a photoelectric sensing head 25 cooperates optically with opaque, perforated tape 24, thereby generating a periodic electrical signal, illustrated by Figure 5(a), representing the span traveled by carriage 13 from a starting position substantially at the bottom of containers 10 and 11. The signal derived from tape sensing head 25 is applied to counter control 26, wherein said signal is passed through a frequency doubler and a wave shaper, thereby converting the periodic signal from tape sensing head 25 to a series of pulses at double the original frequency. From counter control 26, these pulses actuate binary decade counter 27. Thus, it may be seen that the number of pulses counted by binary decade counter 27 at any moment is indicative of the excursion of carriage 13 along guide members 15 from the point of departure at the base of containers 10 and 11.

As carriage 13 is advanced upwardly past the fluid surface of a fluid held in a container such as 10, photoelectric sensing head 23 generates a signal illustrated by Figure 5(h). Converter control 31 received the signal from sensing head 23, combines this signal with a series of positive pulses derived from counter control 26, illustrated by Figure 5(g), and provides a step function output signal of the form illustrated by Figure 5(k). A differentiating circuit is provided in binary-decimal converter and storage circuit 32 for differentiating the step-function obtained from converter control means 31. The resultant pulse, illustrated by Figure 5(l), which occurs substantially simultaneously with the passage of carriage 13 by the surface of the fluid in container 10, serves to transfer the count present in binary decade counter 27 representing the distance carriage 13 has traveled to decimal storage and output means. This pulse closes only those gate circuits which have a binary count presented thereto by counter 27. A translating relay circuit is actuated in a manner hereinabove described by the closed gate circuits which translates the binary count present in counter 27 to a decimal output on a number of output lines with one output line being provided for each digit from 0–9 in each decade. The output lines present the decimal number in a form suitable for use by known data processing machines, such as those requiring an input circuit completed to ground and as will be obvious to one skilled in the art, other output circuits are contemplated, such as by means of voltages applied to proper output lines or pulsed serial output.

The hereinabove disclosed instrumentality illustrates the reading of the fluid level in only one fluid container 10. As will appear obvious to those skilled in the art, the fluid level in numerous additional fluid containers, such as 11 illustrated in Figure 1, may be read simultaneously with the fluid level in container 10. An additional fluid level sensing head 23, a converter control circuit similar to that illustrated in Figure 3, and an additional converter and storage circuit 32, as illustrated in Figure 4, are required to cooperate with each additional fluid container which contains a fluid of which the level is to be read. Tape 24, tape sensing head 25, counter control 26, and binary decade counter 27 may be common to a plurality of fluid level sensing instrumentalities.

Thus, it may be seen that a system is provided for measuring the height of a fluid in a receptacle accurately and automatically and manifesting the result in a digital form capable of actuating automatic data processing or computing equipment in a manner not requiring human observation and consequent errors, thereby promoting economy in time, labor and materials in fluid dynamic studies.

While this invention has herein been disclosed in presently preferred embodiments and usages, it is to be understood that the specification and drawings are to be interpreted solely in an illustrative sense, the scope of the invention being limited solely by the appended claims.

I claim:

1. A device for measuring the height of a fluid in a receptacle comprising sensing means adapted for movement relative to said receptacle and responsive to the level of said fluid for producing an electrical signal, means for moving said sensing means from a predetermined position toward the fluid level, scaling means including pulse generating means and a pulse counter for measuring displacement of said sensing means from the predetermined position, and storage circuits including a converter connected to said pulse counter and to said sensing means for registering the displacement of said sensing means in response to said electrical signal, and a relay circuit connected to said converter for producing a voltage pattern providing a digital indication of fluid height.

2. A device for measuring the height of a fluid in a receptacle comprising sensing means adapted for movement relative to said receptacle and responsive to the level of said fluid, means for moving said sensing means from a predetermined position toward the fluid level, scaling means for producing a binary representation of the displacement of said sensing means from the predetermined position, storage circuits responsive to a signal produced by said sensing means upon reaching the fluid level for transferring the binary representations developed by said scaling means into a binary representation of the fluid height, and means for converting the binary representation into a corresponding decimal digit representation of the height of fluid in said receptacle.

3. Apparatus for measuring the height of a fluid in a receptacle comprising sensing means adapted for movement relative to said receptacle and operable by the level of said fluid, scaling means including means for generating impulses corresponding to movement between said sensing means and said receptacle and counter circuits responsive to said impulses for determining displacement between said sensing means and said receptacle, driving means for moving said sensing means and said scaling means with respect to said receptacle, relay storage and indicator circuits, and circuits actuated by a signal from said sensing means for transferring a condition of said counter circuits to said relay circuits whereby a digital representation of the level of said fluid in said receptacle is established.

4. Apparatus for measuring the height of a fluid in a transparent receptacle comprising photo-responsive sensing means adapted for movement relative to said receptacle and operable by the level of said fluid, scaling means including means for generating impulses corresponding to movement between said sensing means and said receptacle and counter circuits responsive to said impulses for determining displacement between said sensing means and said receptacle, driving means for moving said sensing means and said scaling means with respect to said receptacle, relay storage and indicator circuits, and circuits actuated by said sensing means for transferring a condition of said counter circuits to said relay circuits for establishing a digital representation of the level of said fluid in said receptacle.

5. Apparatus for measuring the height of a fluid in a receptacle comprising sensing means adapted for movement relative to said receptacle and operable by the position of said fluid to provide a pulse, driving means for imparting relative movement between said sensing means and said receptacle, scaling means for measuring displacement between said sensing means and said receptacle, said scaling means including means for generating impulses corresponding to said movement and counting means responsive to said impulses for determining displacement between said sensing means and said receptacle, and storage means interconnected with said counting means and said sensing means, and under control of the pulse produced by said sensing means for establishing a digital representation of the level of said fluid in said receptacle.

6. Apparatus for measuring the height of a fluid in a receptacle comprising photo-responsive sensing means adapted for movement relative to said receptacle and operable by the position of said fluid to provide a pulse, driving means for imparting relative movement between said sensing means and said receptacle, scaling means for measuring displacement between said sensing means and said receptacle, said scaling means including means for generating impulses corresponding to said movement and counting means responsive to said impulses for determining displacement between said sensing means and said receptacle, and storage means interconnected with said counting means and said sensing means, and under control of the pulse produced by said sensing means for establishing a digital representation of the level of said fluid in said receptacle.

7. Apparatus for measuring the level of fluid in a receptacle comprising a sensing device adapted for movement relative to said receptacle and operable by the surface of said fluid to provide a signal, driving means for moving said sensing device from a predetermined position toward the fluid level, scaling means for measuring displacement between said sensing device and said receptacle including a pulse generator for producing impulses corresponding to said movement and a binary counter responsive to said impulses, storage circuits connected to said sensing device and to said binary counter and responsive to said signal produced by said sensing device for transferring the binary representations developed by said binary counter into a binary representation of fluid level in response to said signal from said sensing device, and a converter for converting the binary representation into a corresponding decimal representation of fluid level in said receptacle.

8. Apparatus for measuring the level of fluid in a receptacle comprising a sensing device adapted for movement relative to said receptacle and operable by the surface of said fluid to provide a signal, driving means for imparting relative movement between said sensing device and said receptacle, scaling means for measuring displacement between said sensing device and said receptacle including a pulse generator for producing impulses corresponding to said movement, a counter control circuit connected to said scaling means for shaping said impulses, and a counter connected to said counter control circuit, and storage means connected to said counter and to said sensing device and under control of the signal produced by said sensing device for storing a digital representation of the fluid level in said receptacle in response to said signal.

9. Apparatus for measuring the level of fluid in a receptacle comprising a sensing device adapted for movement relative to said receptacle and operable by the surface of said fluid to provide a signal, driving means for imparting relative movement between said sensing device and said receptacle, scaling means for measuring displacement between said sensing device and said receptacle including a pulse generator for producing impulses corresponding to said movement, a counter control circuit connected to said scaling means for shaping said impulses, and a binary counter connected to said counter control circuit for counting said impulses, a converter control connected to said sensing device and to said counter control circuit for generating an impulse in response to said signal from said sensing device, and a converter circuit connected to said binary counter and responsive to said impulse for producing a decimal digit representation of the fluid level in said receptacle.

10. Apparatus for measuring the level of fluid in a receptacle comprising a sensing device adapted for movement relative to said receptacle and operable by the surface of said fluid to provide a signal, driving means for imparting relative movement between said sensing device and said receptacle, scaling means for measuring displacement between said sensing device and said receptacle including a pulse generator for producing impulses corresponding to said movement, a counter control circuit connected to said scaling means for shaping said impulses and a binary counter connected to said counter control circuit for counting said impulses, a converter control connected to said sensing device and to said counter control circuit for generating an impulse in response to said signal from said sensing device, and a converter circuit including a plurality of gate circuits connected to said binary counter and actuated by said impulse, and a relay connected to said gate circuit for producing a decimal digit representation of the fluid level in said receptacle.

11. Apparatus for measuring the level of fluid in a receptacle comprising a sensing device adapted for movement relative to said receptacle and operable by the surface of said fluid to provide a signal, driving means for imparting relative movement between said sensing device and said receptacle, scaling means for measuring displacement between said sensing device and said receptacle including a pulse generator for producing impulses corresponding to said movement, a counter control circuit including a pulse shaper responsive to said impulses, and a plurality of binary decade counters connected to said counter control circuit for counting said impulses, a converter control connected to said sensing device and to said counter control circuit for generating an impulse in response to said signal from said sensing device, and a plurality of converter circuits, each of said converter circuits including a plurality of gate circuits connected to each of said binary decade counters and actuated by said impulse, and a relay connected to each of said gate circuits for producing a decimal digit representation of the fluid level in said receptacle.

References Cited in the file of this patent

UNITED STATES PATENTS

| | | |
|---|---|---|
| 1,638,103 | Roucka | Aug. 9, 1927 |
| 1,914,937 | Bodine | June 20, 1933 |
| 2,091,303 | Brelsford | Aug. 31, 1937 |
| 2,121,184 | Buckley | June 21, 1938 |
| 2,149,735 | Henderson | Mar. 7, 1939 |
| 2,419,487 | Dresser | Apr. 22, 1947 |
| 2,503,052 | Keinath | Apr. 4, 1950 |
| 2,575,342 | Gridley | Nov. 20, 1951 |
| 2,580,500 | Albert | Jan. 1, 1952 |
| 2,623,936 | Kennedy | Dec. 30, 1952 |
| 2,656,106 | Stabler | Oct. 20, 1953 |
| 2,680,241 | Gridley | June 1, 1954 |
| 2,756,934 | Ziffer | July 31, 1956 |

OTHER REFERENCES

NACA Technical Note 2880, January 1953. (Text and Figures: pp. 1–24, pp. 1, 2 and 19–24 inclusive being superfluous.)

Publ. "A Survey of Analog-to-Digital Converters" in Proceeding of the I.R.E., October 1953, pp. 1455–1468. Copy in 235–61ADC.